United States Patent
Cheon et al.

(10) Patent No.: US 7,646,181 B2
(45) Date of Patent: Jan. 12, 2010

(54) CONTROL CIRCUIT OF DC-DC CONVERTER

(75) Inventors: Jeong In Cheon, Seoul (KR); Byoung Own Min, Gyunggi-do (KR); Chang Woo Ha, Gyunggi-do (KR); Deuk Hee Park, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 154 days.

(21) Appl. No.: 11/928,845

(22) Filed: Oct. 30, 2007

(65) Prior Publication Data

US 2008/0106243 A1 May 8, 2008

(30) Foreign Application Priority Data

Oct. 31, 2006 (KR) .................. 10-2006-0106834

(51) Int. Cl.
G05F 1/40 (2006.01)
G05F 1/56 (2006.01)

(52) U.S. Cl. ...................... 323/268; 323/282
(58) Field of Classification Search ........... 323/238, 323/265, 268, 271, 282, 285, 321, 349–351
See application file for complete search history.

(56) References Cited

U.S. PATENT DOCUMENTS

| 5,479,090 A * | 12/1995 | Schultz .................. 323/284 |
| RE37,609 E | 3/2002 | Bittner |
| 2006/0087297 A1* | 4/2006 | Deng .................... 323/237 |
| 2008/0203989 A1* | 8/2008 | Bacchi et al. .............. 323/284 |

* cited by examiner

Primary Examiner—Matthew V Nguyen
(74) Attorney, Agent, or Firm—Lowe Hauptman Ham & Berner (57) ABSTRACT

A control circuit of a DC-DC converter is provided. A mode selection section selects an Active Clamp Forward (ACF) or a Logic Link Control (LLC) mode. A soft start section generates a soft start signal in the ACF and LLC modes. A PWM comparison section compares a current detection signal with a feedback signal, a feedback reference signal and the soft start signal in the ACF mode, and generates a PWM signal based on a comparison result. A selection section selects the PWM signal of the PWM comparison section in the ACF mode. A clock generation section generates a clock signal having a fixed frequency in the ACF mode, and generates a clock signal having a frequency based on an operating current and the soft start signal in the LLC mode. A latch section maintains the PWM signal in response to the clock signal in the ACF mode and maintains the clock signal in the LLC mode.

10 Claims, 5 Drawing Sheets

CONTROL CIRCUIT OF DC-DC CONVERTER

CROSS-REFERENCE TO RELATED APPLICATIONS

This application claims the priority of Korean Patent Application No. 2006-106834, filed on Oct. 31, 2006, in the Korean Intellectual Property Office, the disclosure of which is incorporated herein by reference.

BACKGROUND OF THE INVENTION

1. Field of the Invention

The present invention relates to a control circuit of a direct current-direct current (DC-DC) converter applied to a power supply such as a switching mode power supply (SMPS) or the like, and more particularly, to a control circuit of a DC-DC converter that can selectively control a logical link control (LLC) resonant half bridge converter as well as an active clamp forward (ACF) converter using a single control circuit capable of selectively supporting an ACF or LLC operating mode.

2. Description of the Related Art

In general, an SMPS is a device for achieving a DC output voltage from a DC input voltage, which is controlled through a filter after being converted into a square waveform voltage by a semiconductor device such as a metal-oxide-semiconductor field-effect transistor (MOSFET) for power as a switch. As compared to a conventional linear power supply, the SMPS is a stabilized power supply having advantages of higher efficiency, higher durability, smaller size, and lighter weight by controlling a power flow using a switching processor of a semiconductor device.

According to switching control modes in this SMPS, there are an ACF converter based on a half bridge and an LLC resonant half bridge converter recently receiving attention. To control each of these converters, a dedicated control device has been developed, which allows a plurality of dedicated integrated circuits (ICs) to operate MOSFETs for power within the SMPS.

For example, the ACF DC-DC converter may be considered to be a half bridge series converter since two active switches are used, and may have a power conversion capacity of up to 500 W as well known. The ACF DC-DC converter may perform soft switching to reduce the loss of switching, and may limit a voltage stress of a switch to improve reliability.

The LLC resonant half bridge converter basically has a half bridge series circuit, which can be designed to adapt to medium or large capacity. The LLC resonant half bridge converter is a power supply system, which is actually applicable to a capacity of 500 W or more and has been recently actively researched. Since the LLC resonant half bridge converter uses a resonance scheme, the loss of switching and the loss of conductivity may be reduced in principle. Accordingly, the LLC resonant half bridge converter is one of circuit systems having great latent potential capable of increasing the power conversion efficiency.

The SMPS plays a role in supplying a load with a constant DC output voltage. When an output voltage is reduced by load fluctuation due to parasitic elements of a component in the converter, it is difficult for the SMPS to be applied as a stabilized power supply. For this reason, a feedback control circuit capable of stabilizing the output voltage is required.

Representative examples of the feedback control circuit are a pulse width modulation (PWM) scheme and a pulse frequency modulation (PFM) scheme. The ACF DC-DC converter conventionally uses a PWM control circuit adopting the PWM scheme. In the LLC resonant half bridge converter, a PFM control circuit adopting the PFM scheme is used and an individual dedicated control device is required for control of each DC-DC converter.

Next, a control scheme of an existing DC-DC converter will be described in more detail.

Conventionally, the SMPS is a device for converting energy using an energy storage device such as an inductor, a transformer, a capacitor, or the like. There are a boost-up or step-up scheme for changing a low input voltage to a high voltage, a step-down scheme as opposed thereto, an inverting scheme for simply inverting the polarity, and the like.

Herein, the DC-DC converter is a circuit for receiving a DC input to obtain a constant DC output voltage by providing feedback suitable for a switching regulator. This circuit is disadvantageous in that noise or ripple occurs in the DC output voltage since energy is transferred in a discontinuous packet scheme every time.

To minimize this noise or ripple, components of an inductor, a capacitor, and the like should be properly selected and a proper control scheme should be used. Conventionally, basic control schemes are the PFM scheme and the PWM scheme as described above.

Using the PWM control scheme, the conventional ACF DC-DC converter generates a constant output voltage by generating a pulse signal whose duty varies with a voltage fed back from an output voltage, a reference voltage, and a pulse signal waveform of an oscillator and controlling a transistor serving as a switch.

In this case, a PWM control circuit controls a pulse width to be large when load is large, thereby constantly maintaining an output voltage.

A clamp circuit included in the DC-DC converter performs a transformer reset function, clamps a switch voltage, and enables a zero voltage switching (ZVS) operation of primary and auxiliary switches.

Using the PFM control scheme, the conventional LLC resonant half bridge converter generates a constant output voltage by turning on/off a transistor serving as a switch using an oscillator's pulse signal whose duty is constant at a fixed frequency, a voltage fed back from an output voltage, and a reference voltage.

In this case, a PFM control circuit may constantly maintain an output voltage by performing a control operation for constantly maintaining a pulse width and lowering a pulse frequency when load is small.

The DC-DC converter has an advantage of superior system efficiency and ensures zero voltage switching over the overall load region due to a large magnetizing current. In the LLC resonant half bridge converter, a gate signal applied to a MOSFET switch is complementary, a duty cycle is 50%, and a variable operating frequency is controlled to adjust an output voltage.

However, it is known that the conventional ACF DC-DC converter unstably operates in a light load situation. Thus, it is recommended to use the conventional ACF DC-DC converter in a heavy load situation.

It is known that the conventional LLC resonant half bridge converter unstably operates in the heavy load situation. Thus, it is recommended to use the conventional LLC resonant half bridge converter in the light load situation.

A control circuit for detecting a load state, controlling the LLC resonant half bridge converter in the PFM scheme for the light load situation, and controlling the ACF DC-DC converter in the PWM scheme for the heavy load situation is disclosed in Korean Patent Publication No. 2005-0007171.

The conventional DC-DC converters respectively require a dedicated control device. However, there is a problem in that a single dedicated device may not be applied to both the ACF DC-DC converter and the LLC resonant half bridge converter.

A dedicated control circuit for controlling each power mode and a control circuit operating in the PWM scheme for the heavy load and operating in the PFM scheme for the light load have been proposed. However, there is a problem in that the ACF DC-DC converter and the LLC resonant half bridge converter may not be supported in a single control device.

SUMMARY OF THE INVENTION

An aspect of the present invention provides a control circuit of a DC-DC converter that can selectively control an LLC resonant half bridge converter as well as an ACF converter using a single control circuit capable of selectively supporting an ACF or LLC operating mode.

According to an aspect of the present invention, there is provided a control circuit of a DC-DC converter including: a mode selection section for selecting an ACF operating mode or an LLC operating mode; a soft start section for generating a soft start signal in the ACF operating mode and the LLC operating mode; a PWM comparison section for comparing a current detection signal from a slope compensation section with a feedback signal, a feedback reference signal and the soft start signal when the ACF operating mode is selected, and generating a PWM signal based on a comparison result; a selection section for selecting the PWM signal of the PWM comparison section when the ACF operating mode is selected; a clock generation section for generating a clock signal having a preset fixed frequency when the ACF operating mode is selected, and generating a clock signal having a frequency based on an operating current and the soft start signal when the LLC operating mode is selected; and a latch section for maintaining the PWM signal through the selection section in response to the clock signal of the clock generation section when the ACF operating mode is selected, and maintaining the clock signal of the clock generation section when the LLC operating mode is selected.

The control circuit of the DC-DC converter may further include the slope compensation section for compensating a slope of the current detection signal when the ACF operating mode is selected.

The control circuit of the DC-DC converter may further include an output driver for generating first and second output signals having a dead time by inverting an output signal of the latch section.

The soft start section may include a soft start circuit for generating the soft start signal in the ACF and in LLC operating modes; and a voltage-to-current (V/I) converter, operable upon selection of the LLC operating mode, for converting the soft start signal of a voltage form into a current form.

The PWM comparison section may include a plurality of inversion input terminals for respectively receiving the feedback signal, the feedback reference signal and the soft start signal when the ACF operating mode is selected; a non-inversion input terminal for receiving the current detection signal from the slope compensation section; and an output terminal for outputting a comparison value by comparing the current detection signal with a smallest value of the feedback signal, the feedback reference signal and the soft start signal.

The PWM comparison section may include a comparator for comparing the current detection signal from the slope compensation section with a smallest value of the feedback signal, the feedback reference signal and the soft start signal, outputting a high level when the current detection signal is more than the smallest value, and outputting a low level when the current detection signal is not more than the smallest value.

The clock generation section may include a frequency controller for controlling the generation of the clock signal having the preset fixed frequency when the ACF operating mode is selected and controlling the generation of the clock signal having the frequency based on the operating current and the soft start signal when the LLC operating mode is selected; and a current-controlled oscillator for generating the clock signal under control of the frequency controller.

When the LLC operating mode is selected, the frequency controller controls generation of a clock signal having a frequency to be gradually lowered by the operating current if the soft start signal is less than a reference level, and controls generation of a clock signal having a preset operating frequency if the soft start signal is more than the reference level.

The latch section may include a reset/set (RS) latch for maintaining the PWM signal through the selection section in response to the clock signal of the clock generation section when the ACF operating mode is selected and maintaining the clock signal of the clock generation section when the LLC operating mode is selected; and a logic element for performing a logical AND operation on an output signal of the RS latch and the clock signal of the clock generation section.

The output driver may include an output circuit for outputting a signal of the latch section; and a dead time controller for outputting the first and second output signals having the dead time by inverting the signal from the output circuit.

BRIEF DESCRIPTION OF THE DRAWINGS

The above and other aspects, features and other advantages of the invention will be more clearly understood from the following detailed description taken in conjunction with the accompanying drawings, in which.

DETAILED DESCRIPTION OF EXEMPLARY EMBODIMENTS

Exemplary embodiments of the invention will now be described in detail with reference to the accompanying drawings.

The invention is not limited to the exemplary embodiments. The exemplary embodiments are used for a better understanding of the technical spirit of the invention. Throughout the drawings, the same reference numerals are assigned to components having the substantially same configurations and functions.

Figure 1:
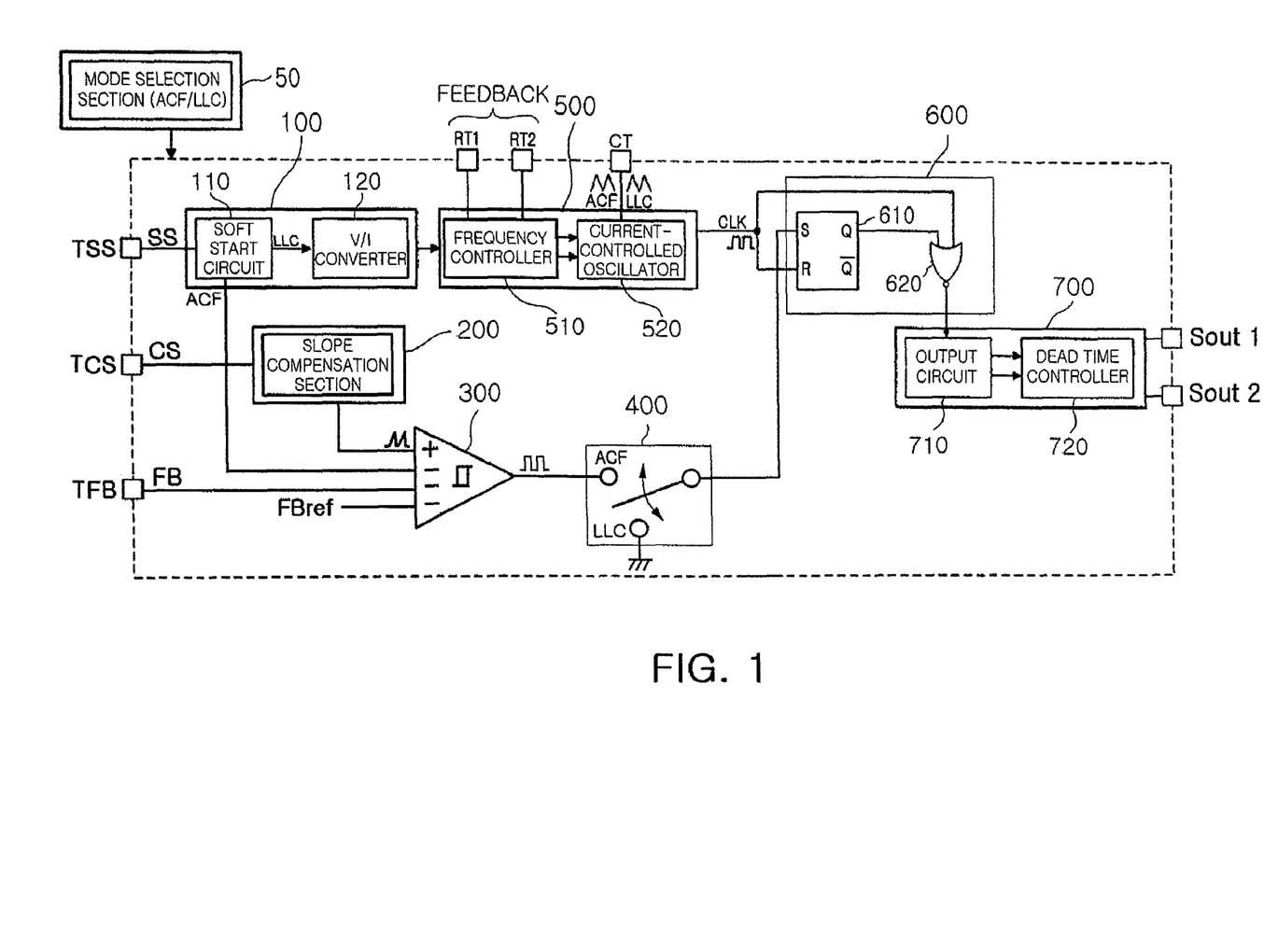
FIG. 1 is a view illustrating a configuration of a control circuit of a DC-DC converter according to an exemplary embodiment of the invention.

FIG. 1 is a view illustrating a configuration of a control circuit of a DC-DC converter according to an exemplary embodiment of the invention.

Referring to FIG. 1, the DC-DC converter according to the exemplary embodiment of the invention includes a mode selection section 50 for selecting an ACF operating mode or an LLC operating mode, a soft start section 100 for generating a soft start signal SS in the ACF operating mode and the LLC operating mode, a PWM comparison section 300 for comparing a current detection signal CS with a feedback signal FB, a feedback reference signal FBref and the soft start signal SS when the ACF operating mode is selected in the mode selection section 50 and generating a PWM signal SPWM based on a comparison result, a selection section 400 for selecting the PWM signal of the PWM comparison section 300 when the ACF operating mode is selected in the mode selection section 50, a clock generation section 500 for generating a clock signal having a preset fixed frequency when the ACF operating mode is selected in the mode selection section 50 and generating a clock signal having a frequency based on an operating current and the soft start signal when the LLC operating mode is selected in the mode selection section 50, and a latch section 600 for maintaining the PWM signal through the selection section 400 in response to the clock signal of the clock generation section 500 when the ACF operating mode is selected in the mode selection section 50 and maintaining the clock signal of the clock generation section 500 when the LLC operating mode is selected in the mode selection section 50.

The control circuit of the DC-DC converter further includes a slope compensation section 200 for compensating a slope of the current detection signal when the ACF operating mode is selected, and an output driver 700 for generating first and second output signals Sout1 and Sout2 having a dead time by inverting an output signal of the latch section 600.

The soft start section 100 can include a soft start circuit 110 for generating the soft start signal SS in the ACF and LLC operating modes, and a V/I converter 120, operable upon selection of the LLC operating mode, for converting the soft start signal SS of a voltage form into a current form.

The PWM comparison section 300 can include a comparator having a plurality of inversion input terminals for respectively receiving the feedback signal FB, the feedback reference signal FBref, and the soft start signal SS when the ACF operating mode is selected in the mode selection section 50, a non-inversion input terminal for receiving the current detection signal CS from the slope compensation section 200, and an output terminal for outputting a comparison value by comparing the current detection signal CS with a smallest value of the feedback signal FB, the feedback reference signal FBref and the soft start signal SS.

When the ACF operating mode is selected in the mode selection section 50, the PWM comparison section 300 compares the current detection signal CS from the slope compensation section 200 with the smallest value of the feedback signal FB, the feedback reference signal FBref and the soft start signal SS. The PWM comparison section 300 outputs a high level when the current detection signal CS is more than the smallest value, and outputs a low level when the current detection signal CS is not more than the smallest value.

The clock generation section 500 can include a frequency controller 510 for controlling the generation of the clock signal having the preset fixed frequency when the ACF operating mode is selected in the mode selection section 50 and controlling the generation of the clock signal having the frequency based on the operating current and the soft start signal when the LLC operating mode is selected in the mode selection section 50, and a current-controlled oscillator 520 for generating the clock signal under control of the frequency controller 510.

When the LLC operating mode is selected in the mode selection section 50, the frequency controller 510 controls the generation of a clock signal having a frequency to be gradually lowered by the operating current if the soft start signal is less than a reference level and controls the generation of a clock signal having a preset operating frequency if the soft start signal is more than the reference level.

The latch section 600 can include an RS latch 610 for maintaining the PWM signal through the selection section 400 in response to the clock signal of the clock generation section 500 when the ACF operating mode is selected in the mode selection section 50 and maintaining the clock signal of the clock generation section 500 when the LLC operating mode is selected in the mode selection section 50, and a logic element 620 for performing a logical AND operation on an output signal of the RS latch 610 and the clock signal of the clock generation section 500.

The output driver 700 can include an output circuit 710 for outputting a signal of the latch section 600 and a dead time controller 720 for outputting the first and second output signals Sout1 and Sout2 having a dead time by inverting the signal from the output circuit 710.

Figure 2:
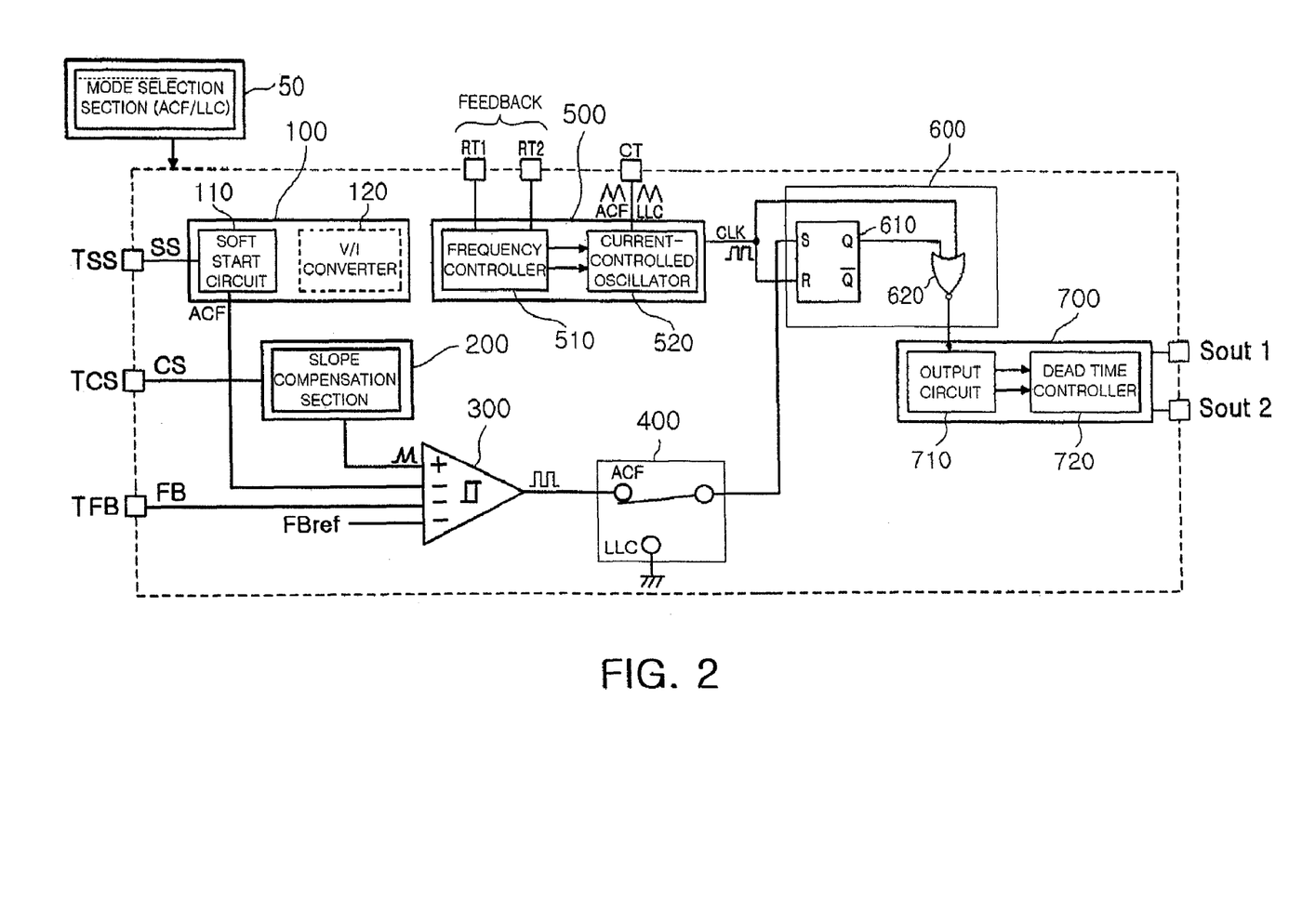
FIG. 2 is a view illustrating an operation of the control circuit of the DC-DC converter when an ACF operating mode is selected.

FIG. 2 is a view illustrating an operation of the control circuit of the DC-DC converter when the ACF operating mode is selected.

Referring to FIG. 2, a soft start signal SS of the soft start section 100 is not input to the clock generation section 500 when the ACF operating mode is selected in the DC-DC converter according to the exemplary embodiment of the invention. Thus, it can be seen that the clock generation section 500 generates a clock signal having a fixed frequency irrespective of the soft start signal SS.

Figure 3:
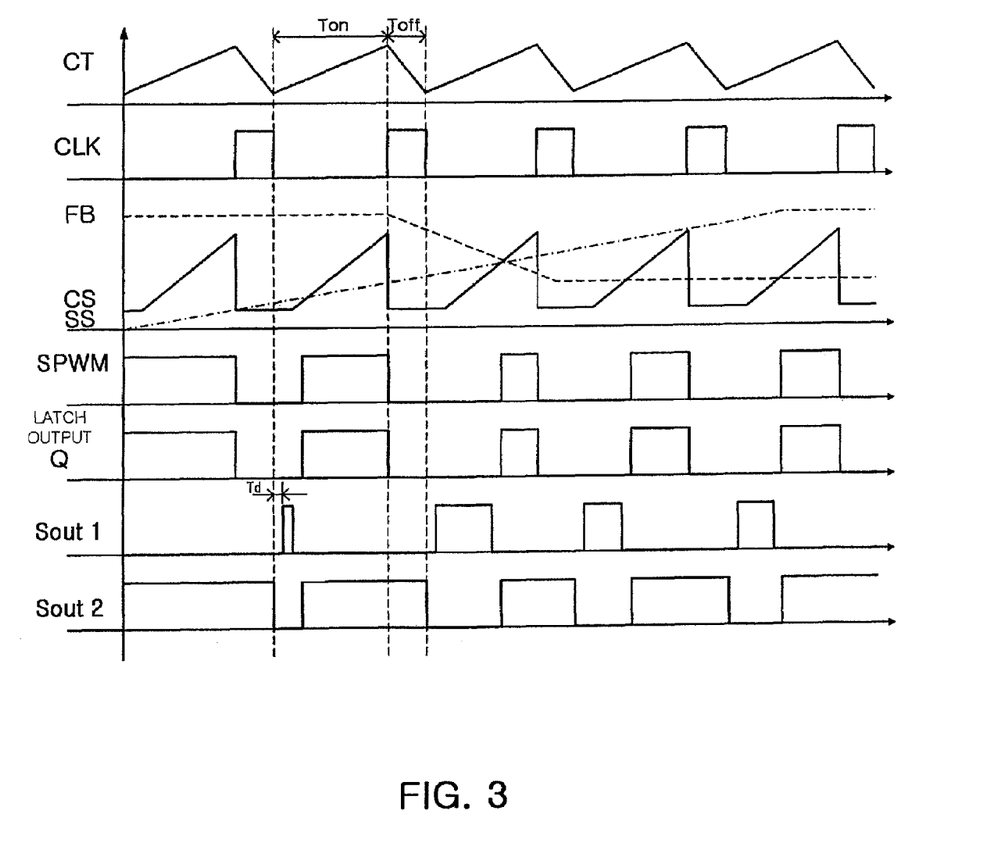
FIG. 3 is a timing chart illustrating main signals of FIG. 2.

FIG. 3 is a timing chart illustrating main signals of FIG. 2.

In FIG. 3, a triangle wave is of a waveform generated from the clock generation section 500, CLK is a clock signal output from the clock generation section 500, FB is a feedback signal, CS is a current detection signal, SS is a soft start signal, SPWM is a PWM signal, Q is an output of the latch section 600, and Sout1 and Sout2 are first and second output signals.

Figure 4:
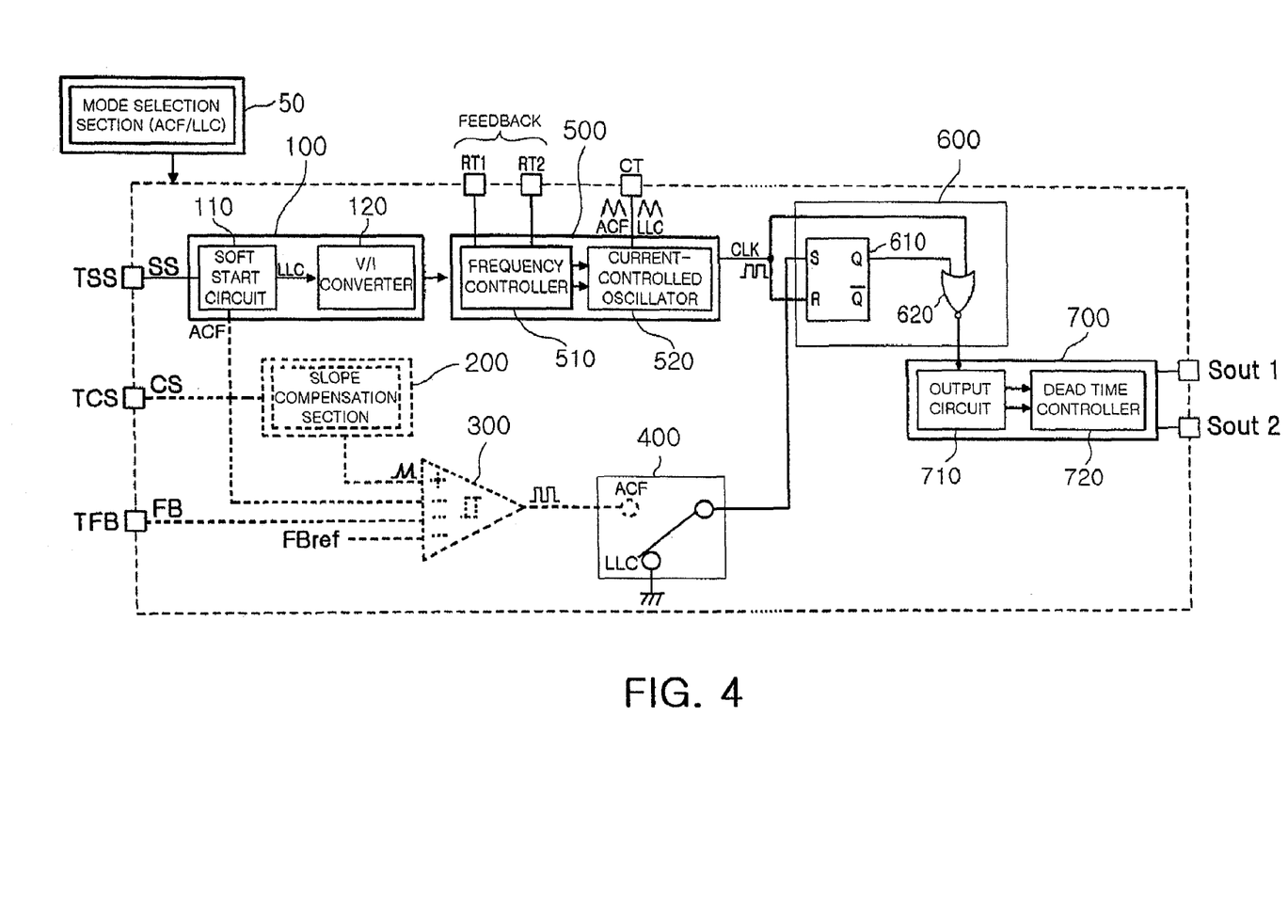
FIG. 4 is a view illustrating an operation of the control circuit of the DC-DC converter when an LLC operating mode is selected.

FIG. 4 is a view illustrating an operation of the control circuit of the DC-DC converter when the LLC operating mode is selected.

Referring to FIG. 4, the slope compensation section 200, the PWM comparison section 300, and the selection section 400 do not operate when the LLC operating mode is selected in the DC-DC converter according to the exemplary embodiment of the invention. Thus, it can be seen that the clock generation section 500 generates a clock signal having a frequency varying with an operating current and a soft start signal SS.

Figure 5:
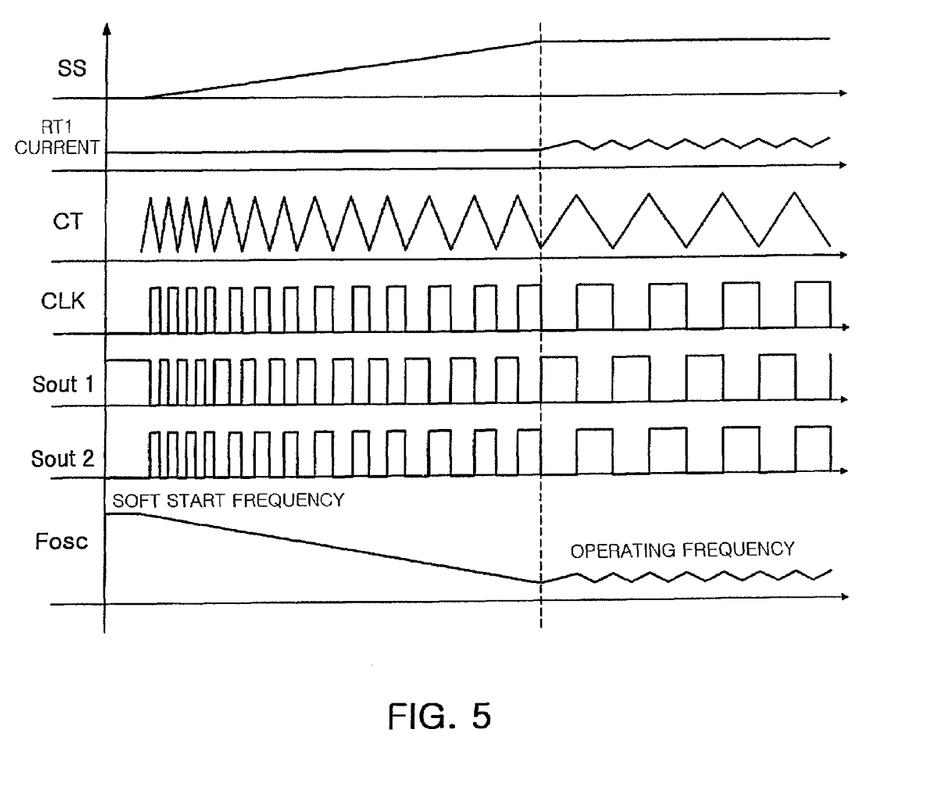
FIG. 5 is a timing chart illustrating main signals of FIG. 4.

FIG. 5 is a timing chart illustrating main signals of FIG. 4.

In FIG. 5, SS is a soft start signal, an RT1 current is a current detected by an external resistor RT1, a triangle wave is of a waveform generated from the clock generation section 500, CLK is a clock signal output from the clock generation section 500, Sout1 and Sout2 are first and second output signals, and Fosc is a frequency of the clock signal generated from the clock generation section 500.

In FIGS. 1 to 5, TSS is a soft start terminal for externally connecting a capacitor to generate a soft start signal. TCS is a terminal for inputting a current detection signal. TFB is a feedback signal input terminal. RT1 and RT2 are terminals for detecting a charge current and a discharge current using a feedback current. CT is a terminal for connecting a capacitor to generate a triangle wave by charging and discharging the charge and discharge currents generated from external RT1 and RT2 pins.

Next, the operation and effect of the invention will be described in detail with reference to the accompanying drawings.

The operation of the DC-DC converter according to the exemplary embodiment of the invention will be described with reference to FIGS. 1 to 5. The DC-DC converter controls the ACF or LLC mode serving as the operating mode selected through the mode selection section 50 shown in FIG. 1.

First, an operation for controlling the ACF operating mode in the DC-DC converter control circuit according to the exemplary embodiment of the invention will be described.

Referring to FIGS. 1, 2, and 3, the soft start section 100 shown in FIGS. 1 and 2 generates a soft start signal SS when the ACF operating mode is selected in the mode selection section 50 and then outputs the soft start signal SS to the PWM comparison section 300.

For example, when the soft start section 100 includes the soft start circuit 110 and the V/I converter 120, the soft start circuit 110 operates in the ACF operating mode and generates the soft start signal SS to be gradually raised as shown in FIG. 3. However, the V/I conversion section 120 does not operate in the ACF operating mode.

At this time, the soft start signal SS uses a voltage charged in a capacitor externally connected through the soft start terminal TSS. As shown in FIG. 3, the soft start signal SS is gradually raised from an operation start time to a stabilization time.

The slope compensation section 200 shown in FIGS. 1 and 2 compensates a slope of a current detection signal CS when the ACF operation mode is selected in the mode selection section 50 and outputs the current detection signal CS whose slope has been compensated to the PWM comparison section 300. The slope is compensated by adding a ramp signal to the current detection signal CS so as to stabilize control instability occurring in the duty of 50% or more.

Herein, the current detection signal CS is obtained by detecting a current of a power semiconductor device switch of the DC-DC converter to which the control circuit according to the exemplary embodiment of the invention is applied.

When the ACF operating mode is selected in the mode selection section 50, the PWM comparison section 300 compares the current detection signal CS from the slope compensation section 200 with the feedback signal FB, the feedback reference signal FBref and the soft start signal SS, and generates a PWM signal based on a comparison result.

That is, when the ACF operating mode is selected in the mode selection section 50, the PWM comparison section 300 compares the current detection signal CS with a smallest value of the feedback signal FB, the feedback reference signal FBref and the soft start signal SS, outputs a high level when the current detection signal CS from the slope compensation section 200 is more than the smallest value, and outputs a low level when the current detection signal CS from the slope compensation section 200 is not more than the smallest value.

Through this operation process, the PWM comparison section 300 outputs a PWM signal SPWM whose pulse width has been modulated in response to the soft start signal SS and the feedback signal FB.

At this time, the PWM signal output from the PWM comparison section 300 is a signal whose pulse width has been modulated as shown in FIG. 3. When the mode selection section 50 selects the ACF operating mode, the PWM signal is selected in the selection section 400 and then is transferred to the latch section 600.

For example, as shown in FIG. 3, the PWM signal is determined by the soft start signal SS at an initial operation time. At this time, the pulse width of the PWM signal SPWM varies with the soft start signal SS. After a system is stabilized, the PWM signal is determined by the feedback signal FB. At this time, the pulse width of the PWM signal varies with the feedback signal FB. When the feedback signal FB is less than a reference value FBref, the operation of the system is stopped.

On the other hand, the clock generation section 500 generates a clock signal CLK having a preset fixed frequency to output the clock signal CLK to the latch section 600 when the ACF operating mode is selected in the mode selection section 50.

For example, when the clock generation section 500 includes the frequency controller 510 and the current-controlled oscillator 520, the frequency controller 510 controls the generation of the clock signal having the preset fixed frequency when the ACF operating mode is selected in the mode selection section 50. Under control of the frequency controller 510, the current-controlled oscillator 520 generates a triangle wave as shown in FIG. 3. The current-controlled oscillator 520 generates a clock signal having a width between a largest value and a smallest value and then outputs the clock signal to the latch section 600.

As described above, the triangle wave can be generated while the charge and discharge currents generated from the external RT1 and RT2 pins are charged and discharged to the capacitor connected to the external CT pin. At this time, a charge time Ton and a discharge time Toff shown in FIG. 3 are determined by the capacitor connected to CT and RT1 and RT2.

When the ACF operating mode is selected in the mode selection section 50, the latch section 600 maintains the PWM signal through the selection section 400 in response to the clock signal of the clock generation section 500 and then outputs the PWM signal to the output driver 700.

For example, when the latch section 600 includes the RS latch 610 and the logic element 620, the RS latch 610 maintains and outputs the PWM signal SPWM through the selection section 400 in response to the clock signal CLK of the clock generation section 500. At this time, the logic element 620 performs a logical AND operation on the output signal of the RS latch 610 and the clock signal CLK of the clock generation section 500 and then outputs an operation result (refer to Sout2 of FIG. 3). At this time, the second output signal and the first output signal Sout1 having a dead time Td can be generated after inverting the second output signal Sout2.

When the logic element is a NOR gate, the first output signal Sout1 of FIG. 3 is generated (refer to Sout1 of FIG. 3). At this time, the first output signal and the second output signal having a dead time Td can be generated after inverting the first output signal Sout1.

The output driver 700 generates the first and second output signals Sout1 and Sout2 having the dead time Td by inverting the output signal of the latch section 600.

For example, the output driver 700 includes the output circuit 710 and the dead time controller 720. In this case, when the output circuit 710 outputs the signal of the latch section 600 to the dead time controller 720, the dead time controller 720 outputs the first and second output signals Sout1 and Sout2 having the dead time Td by inverting the signal from the output circuit 710.

An operation for controlling the LLC operating mode in the DC-DC converter according to the exemplary embodiment of the invention will be described.

Referring to FIGS. 1, 4, and 5, the soft start section 100 shown in FIGS. 1 and 4 generates a soft start signal SS when the LLC operating mode is selected in the mode selection section 50 and then outputs the soft start signal SS to the PWM comparison section 300 and the clock generation section 500.

For example, when the soft start section 100 includes the soft start circuit 110 and the V/I converter 120, the soft start circuit 110 operates in the LLC operating mode to generate the soft start signal SS. The V/I converter 120, operable upon selection of the LLC operating mode, converts the soft start signal of a voltage form into a current form to output the soft start signal of the current form.

At this time, the soft start signal SS can use a voltage charged in a capacitor externally connected through the SS terminal.

When the LLC operating mode is selected in the mode selection section 50, the selection section 400 does not select any output of the PWM comparison section 300. It is preferable that the slope compensation section 200 and the PWM comparison section 300 shown in FIGS. 1 and 4 do not operate when the LLC operating mode is selected. At this time, the selection section 400 outputs a ground level to the latch section 600.

On the other hand, when the LLC operating mode is selected in the mode selection section 50, the clock generation section 500 generates a clock signal having a frequency based on an operating current and the soft start signal SS and then outputs the clock signal to the latch section 600.

For example, when the clock generation section 500 includes the frequency controller 510 and the current-controlled oscillator 520, the frequency controller 510 controls the generation of the clock signal based on the operating frequency and the soft start signal when the LLC operating mode is selected in the mode selection section 50. Under control of the frequency controller 510, the current-controlled oscillator 520 generates the clock signal to output the clock signal to the latch section 600.

Specifically, when the LLC operating mode is selected in the mode selection section 50, the frequency controller 510 controls the generation of a clock signal having a frequency to be gradually lowered by the operating current when the soft start signal SS is less than a reference level, and controls the generation of a clock signal having a preset operating frequency when the soft start signal is more than the reference level.

For example, an operation is performed at an initial operating frequency by a current flowing into the external RT2 at an initial start time. The initial operating frequency is gradually lowered while the soft start signal is stabilized. An operation is performed at a normal operating frequency by the current flowing into the external RT1 pin at a time when the soft start signal is stabilized. The system stabilization is determined by the soft start signal.

That is, when the operation is performed at the initial operating frequency, the frequency is lowered until the normal operating frequency is stabilized.

When the LLC operating mode is selected in the mode selection section 50, the latch section 600 maintains the clock signal of the clock generation section 500 to output the clock signal to the output driver 700.

For example, when the latch section 600 includes the RS latch 610 and the logic element 620, the RS latch 610 maintains and outputs the clock signal of the clock generation section 500 when the LLC operating mode is selected in the mode selection section 50. At this time, the logic element 620 outputs the signal of the RS latch 610.

That is, a square-wave signal going through the clock generation section 500 is applied as a RESET input of the SR latch 610. A SET input of the SR latch 610 is connected to the ground of the selection section 400 and an output Q of the SR latch 610 is constantly set to "0".

That is, a signal obtained by inverting the square-wave signal generated from the clock generation section 500 in the LLC mode is applied to the output driver 700, such that first and second output signals Sout1 and Sout2 having a dead time are output.

The output driver 700 generates the first and second output signals Sout1 and Sout2 having the dead time by inverting the output signal of the latch section 600.

For example, the output driver 700 includes the output circuit 710 and the dead time controller 720. In this case, when the output circuit 710 outputs a signal of the latch section 600 to the dead time controller 720, the dead time controller 720 outputs the first and second output signals Sout1 and Sout2 having the dead time Td by inverting the signal from the output circuit 710.

As described above, the ACF and LLC operating modes can be selectively supported in the control circuit of the DC-DC converter according to the exemplary embodiment of the invention.

According to the invention as described above, an LLC resonant half bridge converter as well as an ACF converter can be selectively controlled using a single control circuit capable of selectively supporting an ACF or LLC operating mode as a control circuit of a DC-DC converter applied to a power supply such as an SMPS or the like.

While the invention has been shown and described in connection with the exemplary embodiments, it will be apparent to those skilled in the art that modifications and variations can be made without departing from the spirit and scope of the invention as defined by the appended claims.

What is claimed is:

1. A control circuit of a direct current-direct current converter, comprising:

a mode selection section for selecting an active clamp forward operating mode or a logic link control operating mode;

a soft start section for generating a soft start signal in the active clamp forward operating mode and the logic link control operating mode;

a pulse width modulation comparison section for comparing a current detection signal from a slope compensation section with a feedback signal, a feedback reference signal and the soft start signal when the active clamp forward operating mode is selected, and generating a pulse width modulation signal based on a comparison result;

a selection section for selecting the pulse width modulation signal of the pulse width modulation comparison section when the active clamp forward operating mode is selected;

a clock generation section for generating a clock signal having a preset fixed frequency when the active clamp forward operating mode is selected, and generating a clock signal having a frequency based on an operating current and the soft start signal when the logical link control operating mode is selected; and a latch section for maintaining the pulse width modulation signal through the selection section in response to the clock signal of the clock generation section when the active clamp forward operating mode is selected, and maintaining the clock signal of the clock generation section when the logical link control operating mode is selected.

2. The control circuit of the direct current-direct current converter of claim 1, further comprising the slope compensation section for compensating a slope of the current detection signal when the active clamp forward operating mode is selected.

3. The control circuit of the direct current-direct current converter of claim 1, further comprising an output driver for generating first and second output signals having a dead time by inverting an output signal of the latch section.

4. The control circuit of the direct current-direct current converter of claim 2, wherein the soft start section includes:
   a soft start circuit for generating the soft start signal in the active clamp forward and in logical link control operating modes; and
   a voltage-to-current converter, operable upon selection of the logical link control operating mode, for converting the soft start signal of a voltage form into a current form.

5. The control circuit of the direct current-direct current converter of claim 4, wherein the pulse width modulation comparison section includes:
   a plurality of inversion input terminals for respectively receiving the feedback signal, the feedback reference signal and the soft start signal when the active clamp forward operating mode is selected;
   a non-inversion input terminal for receiving the current detection signal from the slope compensation section; and
   an output terminal for outputting a comparison value by comparing the current detection signal with a smallest value of the feedback signal, the feedback reference signal and the soft start signal.

6. The control circuit of the direct current-direct current converter of claim 4, wherein the pulse width modulation comparison section includes:
   a comparator for comparing the current detection signal from the slope compensation section with a smallest value of the feedback signal, the feedback reference signal and the soft start signal, outputting a high level when the current detection signal is more than the smallest value, and outputting a low level when the current detection signal is not more than the smallest value.

7. The control circuit of the direct current-direct current converter of claim 4, wherein the clock generation section includes:
   a frequency controller for controlling the generation of the clock signal having the preset fixed frequency when the active clamp forward operating mode is selected, and controlling the generation of the clock signal having the frequency based on the operating current and the soft start signal when the logical link control operating mode is selected; and
   a current-controlled oscillator for generating the clock signal under control of the frequency controller.

8. The control circuit of the direct current-direct current converter of claim 6, wherein, when the logical link control operating mode is selected, the frequency controller controls generation of a clock signal having a frequency to be gradually lowered by the operating current if the soft start signal is less than a reference level and controls generation of a clock signal having a preset operating frequency if the soft start signal is more than the reference level.

9. The control circuit of the direct current-direct current converter of claim 1, wherein the latch section includes:
   a reset/set latch for maintaining the pulse width modulation signal through the selection section in response to the clock signal of the clock generation section when the active clamp forward operating mode is selected and maintaining the clock signal of the clock generation section when the logical link control operating mode is selected; and
   a logic element for performing a logical AND operation on an output signal of the reset/set latch and the clock signal of the clock generation section.

10. The control circuit of the direct current-direct current converter of claim 3, wherein the output driver includes:
    an output circuit for outputting a signal of the latch section; and
    a dead time controller for outputting the first and second output signals having the dead time by inverting the signal from the output circuit.

* * * * *